United States Patent
Corradini et al.

[15] 3,691,141
[45] Sept. 12, 1972

[54] CROSSLINKED TERPOLYMERS OBTAINED WITHOUT SULFUR AND VULCANIZING AGENTS AND METHOD FOR PREPARING SAME

[72] Inventors: Giorgio Corradini; Giuseppe Ghetti; Sabastiano Cesca, all of San Donato Milanese; Sergio Arrighetti, Milan, all of Italy

[73] Assignee: Snam Progetti S.p.A., Milan, Italy
[22] Filed: April 23, 1970
[21] Appl. No.: 31,410

[30] Foreign Application Priority Data
April 23, 1969    Italy.....................15875 A/69

[52] U.S. Cl............................................260/80.78
[51] Int. Cl........C08f 15/40, C08f 17/00, C08f 19/00
[58] Field of Search..................................260/80.78

[56] References Cited
UNITED STATES PATENTS

| | | | |
|---|---|---|---|
| 3,385,889 | 11/1966 | Arnold | 260/80.78 |
| 3,313,786 | 4/1967 | Kahle | 260/79.5 |
| 3,483,173 | 12/1969 | Natta | 260/80.78 |

*Primary Examiner*—Joseph L. Schofer
*Assistant Examiner*—Roger S. Benjamin
*Attorney*—Ralph M. Watson

[57] ABSTRACT

Terpolymers are disclosed which are subject to crosslinking in the absence of any vulcanizing agent or accelerator and which are obtained from $\alpha$-olefine monomers and a terpolymer having side chains consisting of a

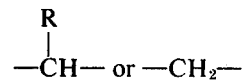

group which is directly linked to two carbon atoms, each of which has an ethylenic bond, e.g.:

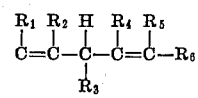

wherein $R_1$, $R_2$, $R_3$, $R_4$, $R_5$, and $R_6$ are selected from the group consisting of hydrogen and hydrocarbon radicals which contain from one to five carbon atoms and which may include pairs of radicals that may be cyclized to form one or more rings having from four to seven carbon atoms.

11 Claims, No Drawings

CROSSLINKED TERPOLYMERS OBTAINED WITHOUT SULFUR AND VULCANIZING AGENTS AND METHOD FOR PREPARING SAME

The present invention refers to new crosslinked terpolymers which do not contain sulfur and the method for preparing same.

It is well known that the crosslinking of polymers, namely hydrocarbon elastomers containing double bonds along the molecule, is carried out by incorporating into the polymer itself some chemical ingredients, such as sulfur, accelerators, zinc oxide, stearic acid and so on which generally, at high temperatures (usually higher than 100° C), form crosslinkings among the polymeric chains causing the obtained product to loose the plastic behavior to assume an elastic one.

Moreover it is known that the crosslinking of polymers, particularly of elastomers may or may not contain double bonds along the molecule, can take place by incorporating into the polymer itself peroxides even when mixed with other chemical ingredients, which at high temperatures (generally higher than 100° C) form crosslinkings among the polymeric chains.

However it is well known that either the use of active accelerators and sulfur containing vulcanizing agents or the use of peroxide type vulcanizing agents causes a remarkable increase of the production cost of the finished crosslinked polymer.

We have now found new polymers which are vulcanized in the absence of any vulcanization ingredient obtained from linear polymers having side chains consisting of a

or —$CH_2$— group which is directly linked to two carbon atoms both of them belonging to an ethylenic double bond.

This group may be exemplified as follows:

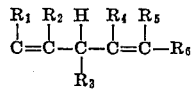

wherein $R_1$, $R_2$, $R_3$, $R_4$, $R_5$, and $R_6$ may be either hydrogen or hydrocarbon radicals having one to five carbon atoms; furthermore the radicals $R_1$ to $R_6$ may be, two by two, one or more divalent radicals, so that they form one or more rings having four to seven carbon atoms.

The above structure may be a cyclopentadiene ring when the two utmost carbon atoms of the group are joined together. The polymers according to the present invention may be preferably obtained by copolymerizing two α-olefins, especially ethylene and propylene, with a polyene having the aforesaid groups in addition to a double bond which is engaged in building the macromolecule.

Nonlimiting examples of termonomers useful for the preparation of crosslinked polymers according to the present invention are those described in copending U. S. patent applications, Ser. No. 855,771, filed Sept. 5, 1969, and Ser. No. 886,390, filed Dec. 18, 1969, in the Italian patent application No. 25242 A/68. The preparation of terpolymers according to the invention may be favorably carried out by employing the following termonomers:

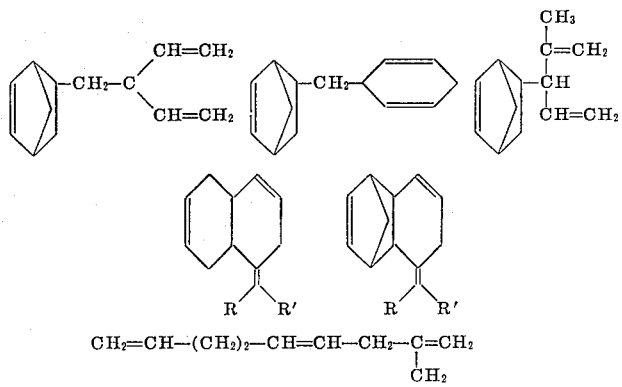

wherein R and R' may be hydrogen or alkyl radicals. According to the present invention the crosslinking of terpolymers or polymers is merely carried out by heating them at a temperature of 100°C to 250°C in a conventional apparatus for a period of 2 to 200 minutes.

Some different extenders may be added to the polymer, for example carbon black, silica, kaolin, calcium carbonate, and so on, and/or paraffin oils, aromatic and naphtenic oils which are commonly employed in the rubber industry.

The following examples are given by way of illustration but do not limit at all the present invention.

EXAMPLE 1 a. An ethylene-propylene-dehydrodicyclopentadiene terpolymer has been synthesized according to the following process: 1,000 cc of n-hexane are introduced, in an inert atmosphere, into a 1,500 cc tubular reactor provided with a mechanical stirrer, thermometric sheath and a jacket for the thermostating fluid. At the same time a mixture of ethylene and propylene, having a molar ratio of 2:1, is introduced into the reactor bottom with a flow of 1200 Nl/h; in order to facilitate the reaching of the equilibrium of saturation, the solvent is vigorously stirred, while its temperature is kept at −20° C by a freezing mixture circulating through the reactor jacket and whose temperature is controlled by a cryostat. The equilibrium conditions can be presumed to be reached in about twenty minutes of bubbling the monomers mixture. Thereafter 1.8 mmoles/lt of $(C_2H_5)_2AlCl$, 0.9 mmoles/lt of anisole and 0.75 mmoles/lt of dehydrodicyclopentadiene (5,2,1,0 - 7a, 3a - decatriene - 3,5, 7a); are introduced into the reactor; while the stream of the gaseous monomers is flowing, the reaction of polymerization is started by a further introduction of 0.3 mmoles/lt of $VCl_4$. The polymerization is carried out for 10 minutes: 0.75 mmoles/lt per minute of dehydrodicyclopentadiene being added.

The reaction is stopped by introducing into the reactor 1 cc of n-butanol. The reaction solution is washed with an aqueous solution of HCl and then with water up to neutrality; then it is coagulated by slowly pouring it into an excess of acetone, to which an aminic antioxidant (AO–4010) has been added.

After drying at 50°C at reduced pressure for 15 h an elastomeric mass is obtained; having the appearance of unvulcanized rubber and weighing 38.2 gr. At X-rays analysis it was entirely amorphous and showed an ethylene content of 59% b.w., whereas the determination of the intrinsic viscosity effected in toluene at 30°C gave a value of $[\mu] = 2.12$ dl/gr.

The determination of the dehydrodicyclopentadiene, effected by iodometric way, gave a value of 1.39% b.w.

b. The sample, prepared as above, was heated in a press at 190°C for 20 minutes, after it was become homogeneous by mixing it in an open mill at room temperature and no ingredient having been added. Some dumbell test pieces obtained from the moulded small, when subjected to tensile stress test, gave the results of the Table 1. In the same table there are reported the results obtained with conventional EPDM terpolymers, subjected to the same treatment as described in the present point (b).

c. In an open mill and at room temperature some carbon black (HAF) has been added to the sample, obtained according to the point(a), at a ratio HAF/polymer of 1:2; the obtained mixture has been heated in a press at 190°C. for 20 minutes; some dumbell test pieces have been obtained therefrom; subjected to tensile stress test they gave the results of Table II. In the same table we report the results obtained with conventional commercial polymers, subjected to the same treatment as described in the present point(c).

The reported data show that the sample RN 5 is vulcanized whereas the samples A, B, C, D, are not vulcanized: moduli and maximum tensile stresses of the former are very high whereas the elongation at break values, very low for A, B, C, D, are similar to those of the mixes of EPDM containing carbon black and not vulcanized.

TABLE II

Polymers added with carbon black HAF (50 p.p.c.) and heated in press at 190° C. for 20 minutes

| Terpolymer having as termonomer | M 50% (kg./cm.²) | M 200% (kg./cm.²) | CR (kg./cm.²) | AR (percent) | P. set (percent) |
|---|---|---|---|---|---|
| RN 5 | 24 | 82 | 193 | 325 | 12 |
| A | 6 | | 5 | 80 | 19 |
| B | 9 | | 10 | 65 | 4 |
| C | 12 | 15 | 15 | 100 | 44 |
| D | 7 | | 7 | 50 | 4 | d. In an open mill and at room temperature some carbon black (HAF) was added to the sample, obtained according to the point(a), at a ratio HAF/polymer of 1:2; the mixture was heated in a press at various temperatures for different periods. Some dumbell test pieces have been obtained from the moulded plates; they gave the results set forth in Table III.

TABLE III

Polymer, added with carbon black HAF (50 p.p.c.), at 120° C., 145° C., 190° C.

| Terpolymer having as monomer | Temperature (° C.) | Time (min.) | M 100% (kg./cm.²) | M 200% (kg./cm.²) | M 300% (kg./cm.²) | CR (kg./cm.²) | AR (percent) | P. set (percent) |
|---|---|---|---|---|---|---|---|---|
| RN 5 | 120 | 15 | 20 | | | 16 | 120 | 17 |
| | | 30 | 22 | 25 | | 25 | 215 | 29 |
| | | 120 | 25 | 44 | 86 | 144 | 415 | 29 |
| | 145 | 5 | 22 | 23 | | 24 | 210 | 25 |
| | | 15 | 32 | 49 | 77 | 90 | 365 | 37 |
| | | 30 | 30 | 53 | 89 | 113 | 365 | 33 |
| | | 60 | 37 | 81 | 166 | 206 | 360 | 17 |
| | 190 | 2 | 26 | 42 | 72 | 122 | 440 | 35 |
| | | 5 | 28 | 53 | 104 | 170 | 415 | 25 |
| | | 10 | 33 | 69 | 133 | 177 | 360 | 17 |
| | | 20 | 35 | 82 | 164 | 193 | 325 | 13 |
| | | 120 | 39 | 93 | | 176 | 260 | 8 |

The reported data show that the sample RN 5 is vulcanized whereas the samples A, B, C, D are not vulcanized. This fact particularly results from the moduli 100 percent and 150 percent, indicative for the vulcanization degree which are very much higher for RN 5; from the elongations at break, very much higher for the samples A, B, C, D and from the permanent set, very much lower for RN 5.

EXAMPLE 2 a. An ethylene-propylene-dehydrodicyclopentadiene terpolymer was synthesized according to the process described in Example 1, paragraph a), using:

| | | |
|---|---|---|
| n-Hexane | = 1000 | cm³ |
| VCl₄ | = 0.4 | mmoles |
| (C₂H₅)₂AlCl | = 2.4 | mmoles |

TABLE I

Polymers heated in press at 190° C. for 20 minutes

| Terpolymer having as monomer | Termonomer (mole/kg.) | Ethylene (percent by weight) | $[\eta]$tol 30° C. | M 100% (kg./cm.²) | M 150% (kg./cm.²) | CR (kg./cm.²) | AR (percent) | P. set (percent) |
|---|---|---|---|---|---|---|---|---|
| RN 5 | 0.107 | 59 | 2.12 | 19 | 26 | 28 | 165 | 0 |
| A | 0.470 | 58 | 1.78 | 5 | 4 | 2 | 3000 | n.d. |
| B | 0.630 | 63 | 1.63 | 6 | 6 | 5 | 1600 | 235 |
| C | 0.44 | 65 | 1.65 | 8 | 9 | 10 | 1100 | 105 |
| D | 0.47 | 60 | 1.80 | 6 | 6 | 4 | 1000 | 100 |

Wherein RN 5 is dehydrodicyclopentadiene or 5,2,1,0-3a,7a decatriene-3,5,7a; A is 1,4 hexadiene; B is ethylidennorbornene; C = dicyclopentadiene; D = methylnorbornene; tol = toluene; M 100% = modulus at 100% elongation; M 150% = modulus at 150% elongation; CR = maximum tensile stress; AR = elongation at break; P. set = permanent set; n.d. = not determined.

| | |
|---|---|
| Anisole | = 1.2 mmoles |
| Dehydrodicyclopentadiene | = 7.5 mmoles |
| Temperature | = 20°C |
| $C_3H_6/C_2H_4$ | = 2.0 mmoles in the gaseous phase |
| Polymerization time | = 4 minutes |

At the end of the reaction and after drying 18.3 g of amorphous elastomer were obtained; they show the following properties:

| | |
|---|---|
| ethylene % by weight | = 61 |
| dehydrocyclopentadiene % b. w. | = 2.47 |
| intrinsec viscosity (in toluene at 30°C.) | = 2.65 dl/gr. | b. The sample, obtained as above, was mixed with carbon black HAF (50 parts for 100 parts of polymer) in an opened mill, at room temperature; it was then divided into two parts which have been heated in a press respectively at 190°C. for 10 minutes and at 145°C. for 30 minutes.

Tensile stress data, from the dumbell test pieces obtained from the molded plates, are given on the Table IV.

b. The sample, obtained according to the point a), has been treated in a press at 190°C. for 20 minutes, after it had become homogeneous by mixing it in an open mill at room temperature. Tensile stress data, from the dumbell test pieces obtained from the plates molded as above, are given on the Table V.

c. The sample, obtained according to the point(a), has been treated at 190°C. for 20 minutes, after it had been mixed with carbon black HAF (50 parts for 100 parts of polymer) at room temperature in an open mill.

On the Table VI there are reported the tensile stress data on the dumbell test pieces obtained from the molded plates.

TABLE V

Treating the polymer alone at 190° C. for 20 minutes

| Terpolymer having as monomer | Termonomer (mole/kg.) | $C_2H_4$ (percent b. w.) | $[\eta]$ tol 30° C. | M 100% (kg./cm.²) | M 200% (kg./cm.²) | CR (kg./cm.²) | AR (percent) | P. set (percent) |
|---|---|---|---|---|---|---|---|---|
| RN 5 | 0.174 | 57 | 1.63 | 13 | 16 | 23 | 260 | 4 |

TABLE VI

Treating the polymer, added with carbon black (50 p.p.c.) at 190° C. for 20 minutes

| Terpolymer having as monomer | M 50% (kg./cm.²) | M 200% (kg./cm.²) | CR (kg./cm.²) | AR (percent) | P. set (percent) |
|---|---|---|---|---|---|
| RN 5 | 19 | 62 | 84 | 255 | 8 |

EXAMPLE 4 a. An ethylene-propylene-2-norbon-5-enyl-4'(or 5')-cyclopentadienyl-methane terpolymer was synthesized according to the process described in the Example 1, paragraph a) using:

| | |
|---|---|
| Toluene | = 1000 cm³ |
| $VO(O\text{-}n\text{-}C_4H_9)_3$ | = 0.8 mmoles |
| $(C_2H_5)_2AlCl$ | = 8 mmoles |

TABLE IV

Polymer added with carbon black HAF (50 p.p.c.) at 190° C. for 20 minutes

| Terpolymer having as monomer | Termonomer (mole/kg.) | $C_2H_4$ (percent b.w.) | $[\eta]$ tol 30° C. | Temp. (° C.) | Time (min.) | M 50% (kg./cm.²) | M 200% (kg./cm.²) | CR (kg./cm.²) | AR (percent) | P. set (percent) |
|---|---|---|---|---|---|---|---|---|---|---|
| 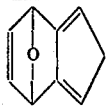 | 0.190 | 61 | 2.65 | 145 | 30 | 24 | 77 | 199 | 375 | 12 |
| | | | | 190 | 10 | 18 | 43 | 145 | 460 | 21 |

EXAMPLE 3 a. An ethylene-propylene-dehydrodicyclopentadiene terpolymer was synthesized according to the process described in the Example 1, paragraph 1, using:

| | |
|---|---|
| $VO(O\text{-}n\text{-}C_4H_9)_3$ | = 1.2 mmoles |
| $(C_2H_5)_2AlCl$ | = 12.0 mmoles |
| Toluene | = 1000 cm³ |
| $C_3H_6/C_2H_4$ | = 2.0 (moles in the gaseous phase) |
| Dehydrodicyclopentodiene | = 15.0 mmoles (1.5 mmoles added minute by minute) |
| Temperature | = 0°C. |
| Reaction time | = 10 minutes |

28.8 g. of elastomers were obtained after coagulating and drying; at X rays examination it was entirely amorphous, and it shows the properties given on the Table V.

| | |
|---|---|
| 2-norbon-5-enyl-4'(or 5')-cyclo-pentadienyl-methane | = 5.5 mmoles (1.8 mmoles were introduced at the beginning and the rest was added minute by minute along the reaction time) |
| $C_3H_6/C_2H_4$ | = 2.0 mmoles in the gaseous phase |
| Temperature | = 0°C |
| Polymerization time | = 10 minutes |

After the reaction solution had been coagulated and the produced polymer had been dried, 12.6 g of elastomer were obtained; at X rays examination it was entirely amorphous, and it showed the properties given on the Table VII.

b. Some carbon black HAF was added to the sample obtained according to the above point a) in an open mill, at room temperature, at a ratio HAF/elastomer of 1:2; afterwards it was molded at the temperature of 120°C., 143°C., 190°C. during periods, respectively, of 15 – 30 – 120 minutes, 5 – 15 – 30 – 60 minutes, 2 – 5 – 10 – 20 – 120 minutes.

On the Table VII are reported the tensile stress data referring to the dumbell test pieces obtained from the molded plates.

| n-heptane | = 1000 cm³ |
| V(Acetylacetonate)₃ | = 0.7 mmoles |
| (C₂H₅)₂AlCl | = 5.6 mmoles |
| C₃H₆/C₂H₄ | = 2.0 mmoles in the gaseous phase |
| (2 or 3)-allyldicyclopentadiene | = 20.3 mmoles |
| Temperature | = 0°C |
| Reaction time | = 15 minutes |

TABLE VII
Polymer, added with carbon black HAF (50 p.p.c.) and heated at 120° C., 190° C.

| Terpolymer having as termonomer | Termonomer (mole/kg.) | C₂H₄ (percent b. w.) | [η]tol 30° C. | Temperature (° C.) | Time (min.) | M 50% (kg./cm.²) | M 100% (kg./cm.²) | M 200% (kg./cm.²) | CR (kg./cm.²) | AR (percent) | P. set (percent) |
|---|---|---|---|---|---|---|---|---|---|---|---|
| H₁₁ | 0.233 | 59 | 1.98 | 120 | 15 | 28 | | | 38 | 80 | 4 |
| | | | | | 30 | 27 | 43 | | 50 | 130 | 6 |
| | | | | | 120 | 22 | 38 | 88 | 92 | 210 | 8 |
| | | | | 145 | 5 | 18 | 26 | | 34 | 155 | 4 |
| | | | | | 15 | 21 | 32 | 68 | 68 | 210 | 13 |
| | | | | | 30 | 23 | 41 | 90 | 114 | 250 | 13 |
| | | | | | 60 | 26 | 48 | 114 | 114 | 200 | 6 |
| | | | | 190 | 2 | 17 | 22 | 40 | 74 | 305 | 18 |
| | | | | | 5 | 18 | 27 | 59 | 167 | 385 | 18 |
| | | | | | 10 | 20 | 30 | 73 | 144 | 290 | 13 |
| | | | | | 20 | 20 | 32 | 79 | 228 | 360 | 13 |
| | | | | | 120 | 24 | 40 | 116 | 224 | 285 | 6 |

NOTE: H₁₁ = 2-norbor-5-enyl-4′ (or 5′)-cyclopentadienyl-methane.

EXAMPLE 5 a. An ethylene-propylene-2-norbor-5-enyl-2′(or 3′)-methyl-4′(or 5′)-cyclopentadienyl-methane was synthesized according to the process described in the Example 1 using:

| n-heptane | = 1000 mm³ |
| V(Acetylacetonate)₃ | = 0.4 mmoles |
| (C₂H₅)₂AlCl | = 3.2 mmoles |
| C₃H₆/C₂H₄ | = 2.0 mmoles in the gaseous phase |
| 2-norbor-5-enyl-2′(or 3′)-methyl-4′(or 5′)-cyclopentadienyl-methane | = 9.7 mmoles |
| Temperature | = 0°C |
| Polymerization time | = 9 minutes |

After coagulating and drying 13.7 g of elastomer were obtained; at X-rays examination it was resulted entirely amorphous, and showed the properties given on the Table VIII.

b. The above sample was mixed with carbon black HAF (50 parts for 100 parts of polymer) in an open mill, at room temperature; then the obtained mix was moulded at 190°C. for 20 minutes.

On the Table VIII there are reported the traction data referring to the dumbell test pieces obtained from the molded plates.

EXAMPLE 6 a. An ethylene-propylene-2(or 3)-allyldicyclopentadiene terpolymer was synthesized according to the process described in the Example 1, using:

After drying 16.4 g of elastomer were obtained; at X-ray examination they were entirely amorphous and they showed the properties of the Table IX.

EXAMPLE 7 a. An ethylene-propylene-2-norbor-5-enyl-3′-pentadiene (1′,4′)-yl-methane was prepared according to the process of the Example 1, paragraph 4, using:

| toluene | = 1000 cm³ |
| VO(O-n-C₄H₉)₃ | = 0.8 mmoles |
| (C₂H₅)₂AlCl | = 8 mmoles |
| 2-norbor-5-enyl-3′-pentadiene (1′,4′)-yl-methane | = 6.5 mmoles (2 mmoles were introduced at the beginning and the rest was added minute by minute along the reaction time) |
| C₃H₆/C₂H₄ | = 2.0 moles in the gaseous phase |
| Temperature | = 0°C. |
| Polymerization time | = 10 minutes |

After the reaction solution had been coagulated and the polymer has been dried, 17 gr of elastomer were obtained; at X-ray examination it resulted entirely amorphous, and it showed the properties given on the Table X.

TABLE VIII
Polymer added with carbon black HAF (50 p.p.c.) and moulded at 190° C. for 20 minutes

| Terpolymer having as termonomer | Termonomer (mole/kg.) | Ethylene (percent b. w.) | [η] tol 30° C. | M 50% (kg./cm.²) | CR (kg./cm.²) | AR (percent) | P. set (percent) |
|---|---|---|---|---|---|---|---|
| H₄ | 0.540 | 60 | 2.2 | 33 | 95 | 150 | 4 |

NOTE: H₄ = 2-norbor-5-enyl-2′(or 3′)-methyl-4′(or 5′)-cyclopentadienylmethane.

TABLE IX
Polymer added with carbon black HAF (50 p.p.c.) and moulded at 190° C. for 20 minutes

| Terpolymer having as termonomer | Termonomer (mole/kg.) | Ethylene (percent b. w.) | [η] tol 30° C. | M 50% (kg./cm.²) | CR (kg./cm.²) | AR (percent) | P. set (percent) |
|---|---|---|---|---|---|---|---|
| A₂ | 0.500 | 63 | 1.56 | 27 | 85 | 190 | 4 |

NOTE: A₂ = 2(or 3)-allyldicyclopentadiene.

b. The above sample was mixed with carbon black HAF (50 parts for 100 parts of polymer) in an open mill at room temperature, and then the mix was moulded at 190°C. for 20 minutes.

On the Table X we report the traction data referring

TABLE X

Terpolymer ethylene-propylene 2-norbor-5-enyl-2-pentadien (1′,4′)-yl-methane added with carbon black HAF (50 p.p.c.=50 parts for 100 parts of elastomers), heated in press at 190° C. for 20 minutes

| Terpolymer having as termonomer | Termonomer (mole/kg.) | Ethylene (percent) b. w.) | $[\eta]$ tol 30° C. | M 200% (kg./cm.²) | CR (kg./cm.²) | AR (kg./cm.²) | P. set (percent) |
|---|---|---|---|---|---|---|---|
| $X_1$ | 0.300 | 58 | 2.12 | 65 | 175 | 290 | 10 |

NOTE: $X_1$=2-norbor-5-enyl-3′-pentalyen(1′,4′)-yl-methane.

WHAT IS CLAIMED IS:

1. The method of preparing a vulcanized polymer which comprises heating to a temperature in the range of 150°C to 250°C, in the absence of any vulcanizing agent or accelerator, a linear terpolymer of two different alpha olefins having up to 10 carbon atoms and a polyene, said linear terpolymer being characterized by side chains that are selected from the group represented by the following formula:

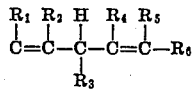

wherein $R_1$, $R_2$, $R_3$, $R_4$, $R_5$, and $R_6$ are members of the group consisting of hydrogen and hydrocarbon radicals which contain from one to five carbon atoms and which may include pairs of radicals that may be cyclized to form one or more rings having from one to seven carbon atoms.

2. The method of preparing a vulcanized polymer according to claim 1 wherein the side chains of said terpolymer are members of the group represented by the formula:

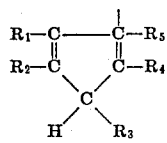

in which $R_1$, $R_2$, $R_3$, $R_4$, and $R_5$ are selected from the group consisting of hydrogen and hydrocarbon radicals which contain from one to five carbon atoms.

3. The method of preparing a vulcanized polymer according to claim 1 wherein one of the alpha olefins is ethylene.

4. The method of preparing a vulcanized polymer according to claim 3 wherein the second alpha olefin is propylene.

5. The method of preparing a vulcanized polymer according to claim 1 wherein the polyene is a member of the group represented by the following formulas:

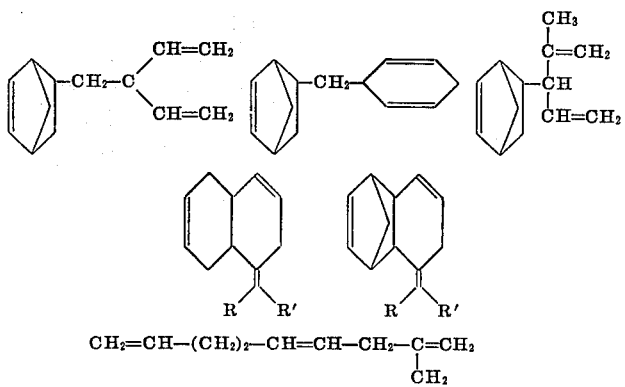

6. The method of preparing a vulcanized polymer according to claim 4 wherein the polyene is dehydrodicyclopentadiene.

7. The method of preparing a vulcanized polymer according to claim 4 wherein the polyene is 2-norbor-5-enyl-2′ (or 3′)-methyl-4′ (or 5′)-cyclopentadienyl-methane.

8. The method of preparing a vulcanized polymer according to claim 4 wherein the polyene is 2 (or 3)-allyl-di-cyclopentadiene.

9. The method of preparing a vulcanized polymer according to claim 4 wherein the polyene is 2-norbor-5-enyl-3′-pentadiene (1′,4′)-yl-methane.

10. A vulcanized polymer prepared according to the process of claim 1.

11. The combination of a vulcanized polymer as claimed in claim 10 and an extender therefor.

* * * * *

PO-1050
(5/69)

UNITED STATES PATENT OFFICE
CERTIFICATE OF CORRECTION

Patent No. __3,691,141__　　　　　Dated __September 12, 1972__

Inventor(s) __Giorgio Corradini, et al__

It is certified that error appears in the above-identified patent and that said Letters Patent are hereby corrected as shown below:

Column 2, line 17, and Column 10, line 22, correct the first formula in each occurrence as follows:

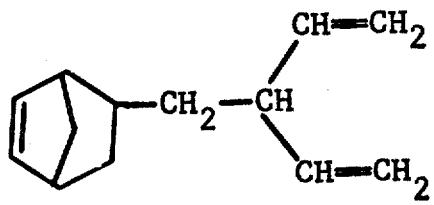

Column 3, line 13, change "[μ]" to -- [η] --.

Column 5, Table IV, under sub-heading "Terpolymer having as Monomer" correct the formula as follows:

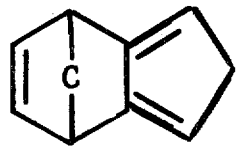

Column 7, line 28, change "$mm^3$" to read --$cm^3$--.

line 37, delete "resulted".

Signed and sealed this 26th day of March 1974.

(SEAL)
Attest:

EDWARD M. FLETCHER, JR.
Attesting Officer

C. MARSHALL DANN
Commissioner of Patents